Patented Jan. 16, 1951

2,538,558

UNITED STATES PATENT OFFICE 2,538,558

SULFANILAMIDOPYRIMIDINE-FORMALDEHYDE CONDENSATION PRODUCTS

Jean Druey, Riehen, Switzerland, assignor to Ciba Pharmaceutical Products, Inc., Summit, N. J.

No Drawing. Application December 19, 1949, Serial No. 133,941. In Switzerland December 19, 1946

1 Claim. (Cl. 260—239.75)

This application is a continuation-in-part of my copending application Serial Number 784,518, filed November 6, 1947.

The present invention relates to therapeutically useful sulfanilamidopyrimidine formaldehyde condensation products of the formulae

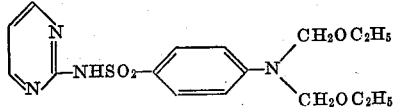

and

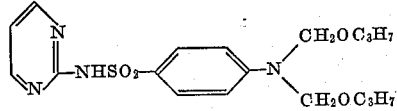

The two new compounds are obtained by reacting 2-sulfanilamido-pyrimidine with formaldehyde and ethanol or propanol, respectively. The compounds are crystallized and their properties are superior to those of the sulfanilamidopyrimidine used as starting material.

The products of the invention find application as medicaments, being capable of administration orally, topically or otherwise, for example intramuscularly in the form of suspensions.

The following examples illustrate the preparation of the new compounds according to the invention. The "parts by weight" bear the same relation to the "parts by volume" as do grams to cubic centimeters.

Example 1

25 parts by weight of 2-sulfanilamidopyrimidine are suspended in 350 parts by volume of 50% ethyl alcohol, the suspension heated to 70° C. while stirring, and then admixed with a warm mixture of 22.5 parts by volume of 40% aqueous formaldehyde solution and 100 parts by volume of 50% ethyl alcohol. A further 22.5 parts by volume of 40% aqueous formaldehyde solution are then gradually added while stirring, a clear solution being formed. Upon cooling, the condensation product precipitates in fine form. There are obtained 28 parts by weight of a nearly white powder which is soluble in dilute caustic soda solution and which melts at about 192° C. with decomposition. The compound corresponds to the formula

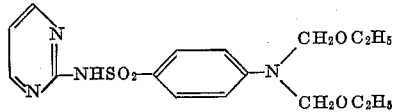

Example 2

125 parts by weight of sulfanilamidopyrimidine are suspended in a mixture of 1400 parts by volume of propanol and 1400 parts by volume of water, and heated to the boil. 450 parts by volume of a 40% aqueous solution of formaldehyde, diluted with 500 parts by volume of water are added, a clear solution being formed. Upon cooling and standing, the reaction product precipitates in the form of colorless needles. After about 24 hours they are separated by suction-filtering and dried at 60° C. The yield is 180 parts by weight. Analysis shows that the new compound corresponds to the formula

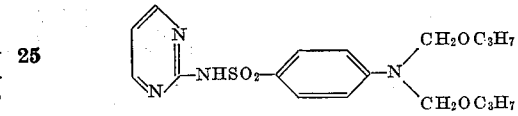

It melts at 151–153° C.

Having thus described the invention, what is claimed is:

A sulfanilamidopyrimidine formaldehyde condensation product of the group consisting of the compounds of the formulae

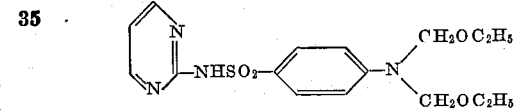

and

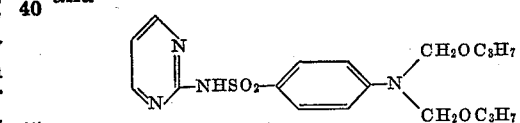

JEAN DRUEY.

No references cited.